(12) United States Patent
Nakayama et al.

(10) Patent No.: US 10,297,806 B2
(45) Date of Patent: May 21, 2019

(54) CONNECTION STRUCTURE FOR ELECTRICAL STORAGE ELEMENT GROUPS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Osamu Nakayama, Mie (JP); Mitsutoshi Morita, Mie (JP); Tetsuya Fujita, Mie (JP); Tomoaki Yasuda, Mie (JP); Koichiro Mochizuki, Mie (JP)

(73) Assignees: AutoNetworks Technologies, Ltd. (JP); Sumitomo Wiring Systems, Ltd. (JP); Sumitomo Electric Industries, Ltd. (JP)

( * ) Notice: Subject to any disclaimer, the term of this patent is extended or adjusted under 35 U.S.C. 154(b) by 259 days.

(21) Appl. No.: 15/037,082

(22) PCT Filed: Oct. 10, 2014

(86) PCT No.: PCT/JP2014/077160
§ 371 (c)(1),
(2) Date: May 17, 2016

(87) PCT Pub. No.: WO2015/076034
PCT Pub. Date: May 28, 2015

(65) Prior Publication Data
US 2016/0293925 A1 Oct. 6, 2016

(30) Foreign Application Priority Data
Nov. 22, 2013 (JP) .................................. 2013-241754

(51) Int. Cl.
*H01M 2/20* (2006.01)
*H01G 11/10* (2013.01)
(Continued)

(52) U.S. Cl.
CPC ............ *H01M 2/206* (2013.01); *H01G 11/10* (2013.01); *H01G 11/76* (2013.01);
(Continued)

(58) Field of Classification Search
CPC ........................... H01M 2/206; H01M 2/1077
See application file for complete search history.

(56) References Cited

U.S. PATENT DOCUMENTS

2010/0009251 A1  1/2010  Shin et al.
2010/0266887 A1  10/2010  Sekino et al.
(Continued)

FOREIGN PATENT DOCUMENTS

JP   2010-519676   6/2010
JP   2012/081140   6/2012
(Continued)

OTHER PUBLICATIONS

European Search Report dated Dec. 15, 2016.
International Search Report.

*Primary Examiner* — Ula C Ruddock
*Assistant Examiner* — Thomas H. Parsons
(74) *Attorney, Agent, or Firm* — Gerald E. Hespos; Michael J. Porco; Matthew T. Hespos

(57) ABSTRACT

A connection structure (10) is provided for connecting electrical storage element groups (12), each of which is formed by connecting electrical storage elements (13) having electrode terminals (14) in series, side by side. The electrical storage element groups (12) are connected electrically by connecting a connecting member (20) for connecting adjacent electrical storage element groups (12) to a (Continued)

first electrode terminal (16A) and a second electrode terminal (16B). The first electrode terminal (16A) is arranged on one end part of one electrical storage element group (12) and on the side of the adjacent other electrical storage element group (12) and the second electrode terminal (16B) is the electrode terminal (14) arranged on another end part of the other electrical storage element group (12B) opposite to the one end part of the one electrical storage element group (12A) and on the side of the adjacent one electrical storage element group (12A).

4 Claims, 14 Drawing Sheets

(51) Int. Cl.
*H01M 2/34* (2006.01)
*H01G 11/76* (2013.01)
*H01M 2/10* (2006.01)
*H01G 2/04* (2006.01)

(52) U.S. Cl.
CPC ........... *H01M 2/1077* (2013.01); *H01M 2/34* (2013.01); *H01G 2/04* (2013.01); *H01M 2220/20* (2013.01); *Y02E 60/13* (2013.01)

(56) References Cited

U.S. PATENT DOCUMENTS

| | | |
|---|---|---|
| 2010/0270097 A1 | 10/2010 | Prakash et al. |
| 2012/0270097 A1 | 10/2012 | Yasui et al. |
| 2013/0161053 A1 | 6/2013 | Okamoto |
| 2013/0230761 A1 | 9/2013 | Okutani |
| 2013/0280589 A1 | 10/2013 | Nakayama |
| 2014/0158396 A1 | 6/2014 | Nakayama |
| 2014/0186676 A1 | 7/2014 | Ebisawa |

FOREIGN PATENT DOCUMENTS

| | | |
|---|---|---|
| JP | 2013-37988 | 2/2013 |
| JP | 2013-187046 | 9/2013 |
| WO | 2009/041018 | 4/2009 |
| WO | 2012/120974 | 9/2012 |

CONNECTION STRUCTURE FOR ELECTRICAL STORAGE ELEMENT GROUPS

BACKGROUND

1. Field of the Invention

The present invention relates to a connection structure for electrical storage element groups.

2. Description of the Related Art

An electrical storage module for a vehicle such as an electric vehicle or a hybrid vehicle is configured such that a plurality of electrical storage elements having positive and negative electrode terminals are arranged side by side and connected in series and in parallel by connecting the electrode terminals of adjacent electrical storage elements by connecting members.

An electric vehicle or the like requires an electrical storage module having a high voltage and a high output in some cases. In such cases, a plurality of electrical storage element groups each formed by laminating a plurality of electrical storage elements may be arranged side by side and connected in series (see, for example, Japanese Unexamined Patent Publication No. 2013-37988).

In an electrical storage module described in Japanese Unexamined Patent Publication No. 2013-37988, a plurality of electrical storage elements are connected in series by connecting electrode terminals of adjacent electrical storage elements in a lamination direction by busbars and connecting the electrode terminals of adjacent electrical storage element groups by connecting members having a first shape (see FIG. 7 of Japanese Unexamined Patent Publication No. 2013-37988).

In the electrical storage module having such a connection structure, the connecting members having the first shape for connecting between the adjacent electrical storage element groups are necessary as many as the (laminated) electrical storage elements constituting the electrical storage element groups. Thus, there have been problems that cost is high and the electrical storage module is heavy.

The present invention was completed based on the above situation and aims to provide a connection structure for electrical storage element groups reduced in cost and weight.

SUMMARY

The present invention is directed to a connection structure for electrical storage element groups for connecting a plurality of electrical storage element groups side by side. Each electrical storage element group is formed by connecting a plurality of electrical storage elements each having positive and negative electrode terminals on the same surface in series. The electrical storage element groups are connected electrically by connecting a connecting member for connecting adjacent ones of the electrical storage element groups to a first electrode terminal and a second electrode terminal. The first electrode terminal is the electrode terminal arranged on one end part of one electrical storage element group and on the side of the adjacent other electrical storage element group. The second electrode terminal is the electrode terminal arranged on another end part of the other electrical storage element group opposite to the one end part of the one electrical storage element group and on the side of the adjacent one electrical storage element group.

The adjacent electrical storage element groups are connected by connecting the connecting member to the first electrode terminal that is the electrode terminal arranged on the one end part of the one electrical storage element group and on the side of the adjacent other electrical storage element group, and the second electrode terminal that is the electrode terminal arranged on the other end part of the other electrical storage element group opposite to the one end part of the one electrical storage element group and on the side of the one adjacent electrical storage element group. Note that the electrical storage elements constituting one electrical storage element group are connected in series.

The adjacent electrical storage element groups can be connected electrically by one connecting member regardless of the number of the electrical storage elements constituting the electrical storage element groups. Thus, weight saving is possible and a material for fabricating the connecting member can be reduced. As a result, it is possible to provide a connection structure for electrical storage element groups reduced in cost and weight.

The present invention may be configured as follows.

An insulation protector may be provided may be made of an insulating material. The insulation protector includes a holding portion for holding the connecting member and is dividable for each of the electrical storage element groups. The connecting member may include two terminal connecting portions to be connected respectively to the first and second electrode terminals. A linking portion links the two terminal connecting portions. The holding portion of the insulation protector may include a protection wall arranged along a peripheral edge of the connecting member, and a clearance may be provided between the linking portion of the connecting member and the protection wall. In this configuration, the insulation protector is dividable for each electrical storage element group and the clearance is provided between the protection wall of the holding portion of the insulation protector and the linking portion of the connecting member. Thus, the connecting member moves in the holding portion to accommodate a displacement between the first electrode terminal and the terminal connecting portion and that between the second electrode terminal and the terminal connecting portion in an arrangement direction of the adjacent electrical storage elements and an arrangement direction of the electrical storage element groups.

A clearance may be provided between an end part of the terminal connecting portion of the connecting member and the protection wall. If this configuration is adopted, the displacement between the first electrode terminal and the terminal connecting portion and that between the second electrode terminal and the terminal connecting portion in the arrangement direction of the electrical storage element groups can be accommodated.

The insulation protector may include a positioning portion to be positioned with respect to the electrical storage element groups. If this configuration is adopted, the insulation protector can be positioned with respect to the electrical storage element groups. Therefore an operation of mounting the insulation protector on the electrical storage element groups is performed easily.

The linking portion of the connecting member may include a locking portion to be locked to the holding portion of the insulation protector. This configuration can suppress excessive movements of the connecting member can be suppressed.

According to the present invention, it is possible to provide a connection structure for electrical storage element groups reduced in cost and weight.

DETAILED DESCRIPTION

A first embodiment of the invention is described with reference to FIGS. 1 to 10.

Figure 1:
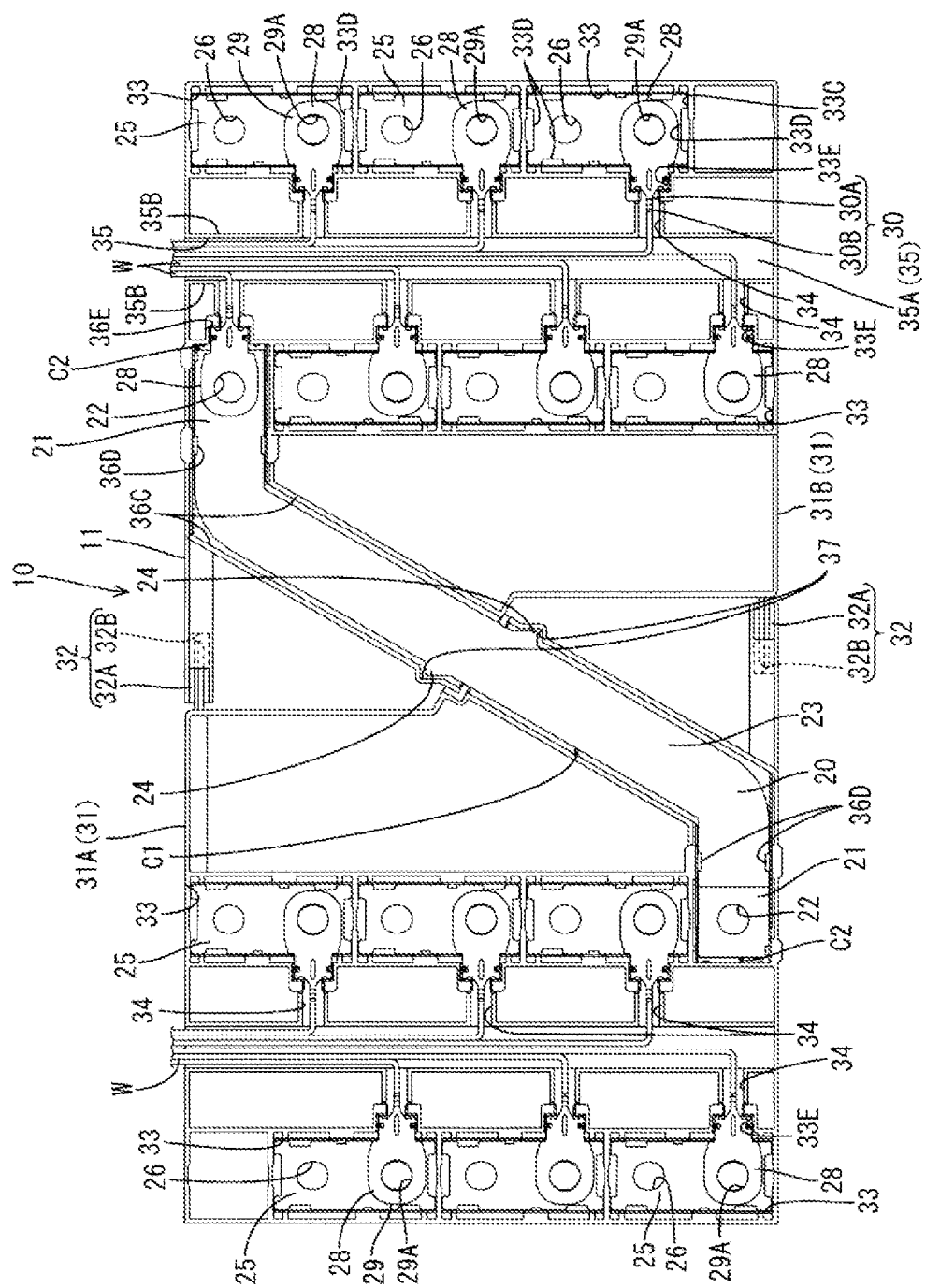
FIG. 1 shows an insulation protector used in a connection structure for electrical storage element groups of a first embodiment.
Figure 2:
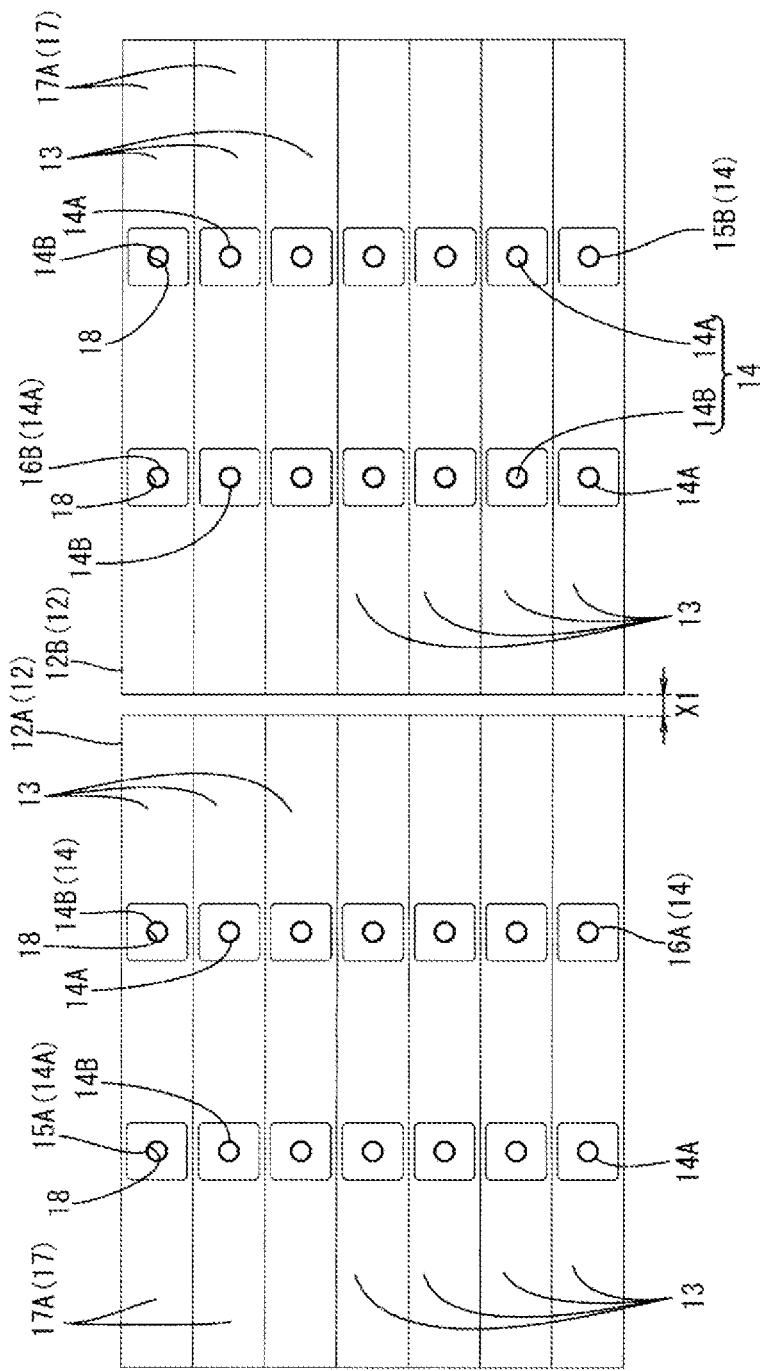
FIG. 2 is a plan view of electrical storage element groups on which the insulation protector of FIG. 1 is to be mounted.

A connection structure 10 for electrical storage element groups 12 of this embodiment is such that a plurality of (two in this embodiment) electrical storage element groups 12 are connected side by side as shown in FIG. 2. As shown in FIG. 1, the connection structure 10 for the electrical storage element groups 12 includes a first connecting member 20 (an example of a connecting member) for connecting the adjacent electrical storage element groups 12, second connecting members 25 for connecting between electrical storage elements 13, 13 constituting the electrical storage element groups 12 and an insulation protector 31 having a second holding portion 36 (an example of a holding portion) for holding the first connecting member 20. An electrical storage module (not shown) formed by connecting the plurality of electrical storage element groups 12 is used, for example, as a drive source of a vehicle such as an electric vehicle or a hybrid vehicle.

(Electrical Storage Device Groups 12)

As shown in FIG. 2, each electrical storage element group 12 is formed by connecting a plurality of (seven in this embodiment) electrical storage elements 13 in series. Each electrical storage element 13 includes positive and negative electrode terminals 14 on an electrode forming surface 17A (an example of the same surface) of a main body 17. In each electrical storage element group 12, the electrical storage elements 13, 13 adjacent in a vertical direction of FIG. 2 are arranged so that the polarities of the electrode terminals 14, 14 thereof are opposite.

The adjacent two electrical storage element groups 12 (12A, 12B) are arranged so that an input terminal 15A and an output terminal 15B are diagonal to each other. Out of the electrode terminals 14 of the two electrical storage element groups 12, the electrode terminal 14 on a left upper end part of the left electrical storage element group (first electrical storage element group 12A) in FIG. 2 is the input terminal 15A and the electrode terminal 14 on a shown right lower end part of the right electrical storage element group (second electrical storage element group 12B) is the output terminal 15B.

In this embodiment, the electrode terminal 14 arranged on a shown lower end part (an example of one end part) of the first electrical storage element group 12A (an example of one electrical storage element group) and on the side of the second electrical storage element group 12B (on the side of the adjacent other electrical storage element group) is a first electrode terminal 16A. The electrode terminal 14 arranged on a shown upper end part (an example of another end part opposite to the one end part of the first electrical storage element group 12A) of the second electrical storage element group 12B (an example of the other electrical storage element group) and on the side of the first electrical storage element group 12A (on the side of the adjacent one electrical storage element group) is a second electrode terminal 16B.

The electrical storage element 13 includes the electrode terminals 14 (positive electrode terminal 14 is denoted by 14A and negative electrode terminal 14 is denoted by 14B) perpendicularly projecting from the main body 17 in the form of a flat rectangular parallelepiped containing unillustrated electrical storage constituents inside. The positive and negative electrode terminals 14A, 14B of the electrical storage element 13 are rectangular tube nuts and circular screw holes 18 penetrate therethrough. The insulation protector 31 is fixed by aligning through holes 26 of the second connecting members 25 with the screw holes 18 of these nuts and threadedly engaging shafts of bolts (not shown) with these aligned holes.

(Second Connecting Member 25)

The second connecting member 25 is made of metal, such as copper, copper alloy, stainless steel (SUS) or aluminum and in the form of a plate having a length corresponding to a dimension between the electrode terminals 14A, 14B to be connected. Two of the through holes 26 penetrate through the second connecting member 25, and the shafts of the bolts (not shown) are inserted threrethrough. These through holes 26 have an elliptical shape long in a lateral direction.

(First Connecting Member 20)

The first connecting member 20 is made of metal such as copper, copper alloy, stainless steel (SUS) or aluminum. The first connecting member 20 includes a terminal connecting portion 21 to be connected to the first electrode terminal 16A arranged on a left lower end part in FIG. 1 and a terminal connecting portion 21 to be connected to the second electrode terminal 16B arranged on a shown right upper end part.

Through holes 22 penetrate through the second connecting member 25 and the shafts of the bolts are inserted therethrough. The through holes 22 of the first connecting member 21 are larger than the through holes 26 of the second connecting members 25 and are capable of accommodating tolerances. A part linking the two terminal connecting portions 21 of the first connecting member 20 is a link 23. The link 23 is formed with locks 24 to be locked to the second holding portion 36 of the insulation protector and project outward. The link 23 is arranged in an oblique direction.

(Voltage Detection Terminal 28)

The connection structure 10 for the electrical storage element groups 12 of this embodiment includes voltage detection terminals 28 respectively arranged to overlap the second connecting members 25 and the first connecting member 20.

The voltage detection terminal 28 is for detecting a voltage of the electrical storage element 13 and includes, as shown in FIG. 1, a connecting portion 29 in the form of a flat plate formed in a central part with a penetrating circular insertion hole 29A through which the shaft of the bolt is insertable, and a wire connecting portion 30 connected to an end part of the connecting portion 29 and to be connected to an end of a wire W. The connecting portion 29 of the voltage detection terminal 28 is a part to be overlapped and connected to the second connecting member 25 or the first connecting member 20.

The wire connecting portion 30 is crimped to a conductor exposed by stripping an insulation coating of the end of the coated wire W and includes a wire barrel 30A to be crimped to a conductor part of the wire W and an insulation barrel 30B to be caulked onto the insulation coating of the wire W from above.

The wire W connected to the voltage detection terminal 28 is drawn out from a wire draw-out portion 34 to a wire holding portion 35 and guided to an unillustrated battery ECU. This battery ECU is mounted with a microcomputer, devices and the like and has a known configuration with functions of detecting voltages, currents, temperatures and the like of the electrical storage elements 13 and executing a charge/discharge control of each electrical storage element 13.

(Insulation Protector 31)

The insulation protector 31 is made of an insulating material and dividable into two units 31A, 31B for each electrical storage element group 12, as shown in FIG. 1. The insulation protector 31 is configured by coupling the two units 31A, 31 B via coupling portions 32 (described in detail later).

Two rows of first holding portions 33 for holding the second connecting members 25 connecting between the electrical storage elements 13, 13 and the wire holding portions 35 for holding the wires W for voltage detection are provided on each of left and right end parts of the insulation protector 31 in FIG. 1. Further, the coupling portions 32 for coupling the two units 31A, 31 B and the second holding portion 36 (an example of a holding portion) for holding the first connecting member 20 connecting between the adjacent electrical storage element groups 12A, 12B are provided substantially in the center of the insulation protector 31.

The first holding portion 33 includes a bottom plate 33A on which each second connecting member 25 is to be placed and a holding wall 33C standing up from the bottom plate 33A along the outer peripheral edge of the second connecting members 25. Further, a retaining protrusion 33D for retaining the second connecting member 25, a terminal holding portion 33E for holding the voltage detection terminal 28 and the groove-like wire draw-out portion 34 connected to the terminal holding portion 33E and configured to draw out the wire W toward the wire holding portion 35 are provided on the inner surface of the holding wall 33C of the first holding portion 33. The wire draw-out portion 34 is connected to the wire holding portion 35. Parts of the bottom plate 33A into which the electrode terminals 14 are to be inserted define openings 33B where the bottom plate 33A is absent.

The holding wall 33C is set at a height where a short circuit due to the contact of a tool or the like with the second connecting member 25 or a head part of the bolt can be prevented.

The wire holding portion 35 for holding the wires W connected to the voltage detection terminals 28 is provided between the two rows of the first holding portions 33, 33. The wire holding portion 35 includes a bottom wall 35A on which the wires W are to be placed, and a pair of side walls 35B, 35B standing up from the bottom wall 35A. Parts of the side walls 35B connected to the wire draw-out portions 34 are open.

The coupling portion 32 coupling the two units 31A, 31B is composed of a coupling protrusion 32A and a coupling receiving portion 32B for receiving the coupling protrusion 32A, and the two units 31A, 31 B are coupled by the coupling protrusion 32A of one (31A or 31B) of the adjacent units 31A, 31B being received by the coupling receiving portion 32B of the other unit (31 B or 31A). The coupling protrusion 32A is movable in the coupling receiving portion 32B in an arrangement direction of the electrical storage element groups 12 (lateral direction of FIG. 1) and an arrangement direction of the electrical storage elements 13 (vertical direction of FIG. 1).

The second holding portion 36 for holding the first connecting member 20 includes a bottom plate 36A on which the first connecting member 20 is to be placed, and a protection wall 36C standing up from the bottom plate 36A along the outer peripheral edge of the first connecting member 20. A part of the protection wall 36C where one end part (end part arranged on a right upper side shown in FIG. 1) of the first connecting member 20 is to be arranged is formed with a terminal holding portion 36E for holding the voltage detection terminal 28. Parts of the bottom plate 36A where the electrode terminals 14 are to be arranged serve as openings 36B where the bottom plate 36A is absent. The protection wall 36C is set at a height where a short circuit due to the contact of the tool or the like with the first connecting member 20 or the head part of the bolt can be prevented.

Retaining protrusions 36D for retaining the first connecting member 20 are provided on the inner surface of the protection wall 36C. Further, the protection wall 36C is formed with locked portions 37 to which the locks 24 of the first connecting member 20 are to be locked. Clearances C1 are provided between the protection wall 36C and the link 23 of the first connecting member 20 so that the first connecting member 20 moves in the second holding portion 36 to accommodate a displacement between the first electrode terminal 16A and the terminal connecting portion 21 and that between the second electrode terminal 16B and the terminal connecting portion 21 in the arrangement direction of the electrical storage elements 13 and the arrangement direction of the electrical storage element groups 12.

Further, clearances C2 also are provided between the protection wall 36C and end parts 21A of the terminal connecting portions 21 of the first connecting member 20 to accommodate the displacement between the first end part 16A and the terminal connecting portion 21 and that between the second electrode terminal 16B and the terminal connecting portion 21 in the arrangement direction of the electrical storage element groups 12.

Figure 3:
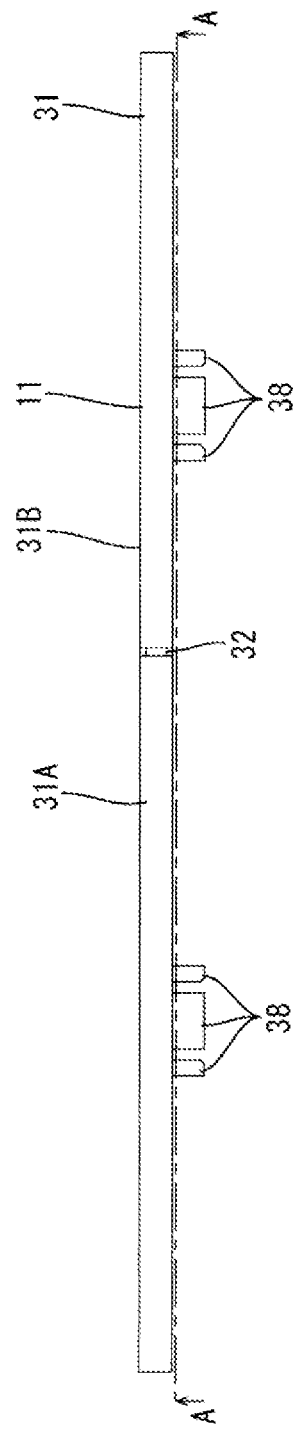
FIG. 3 is a side view of the insulation protector.
Figure 4:
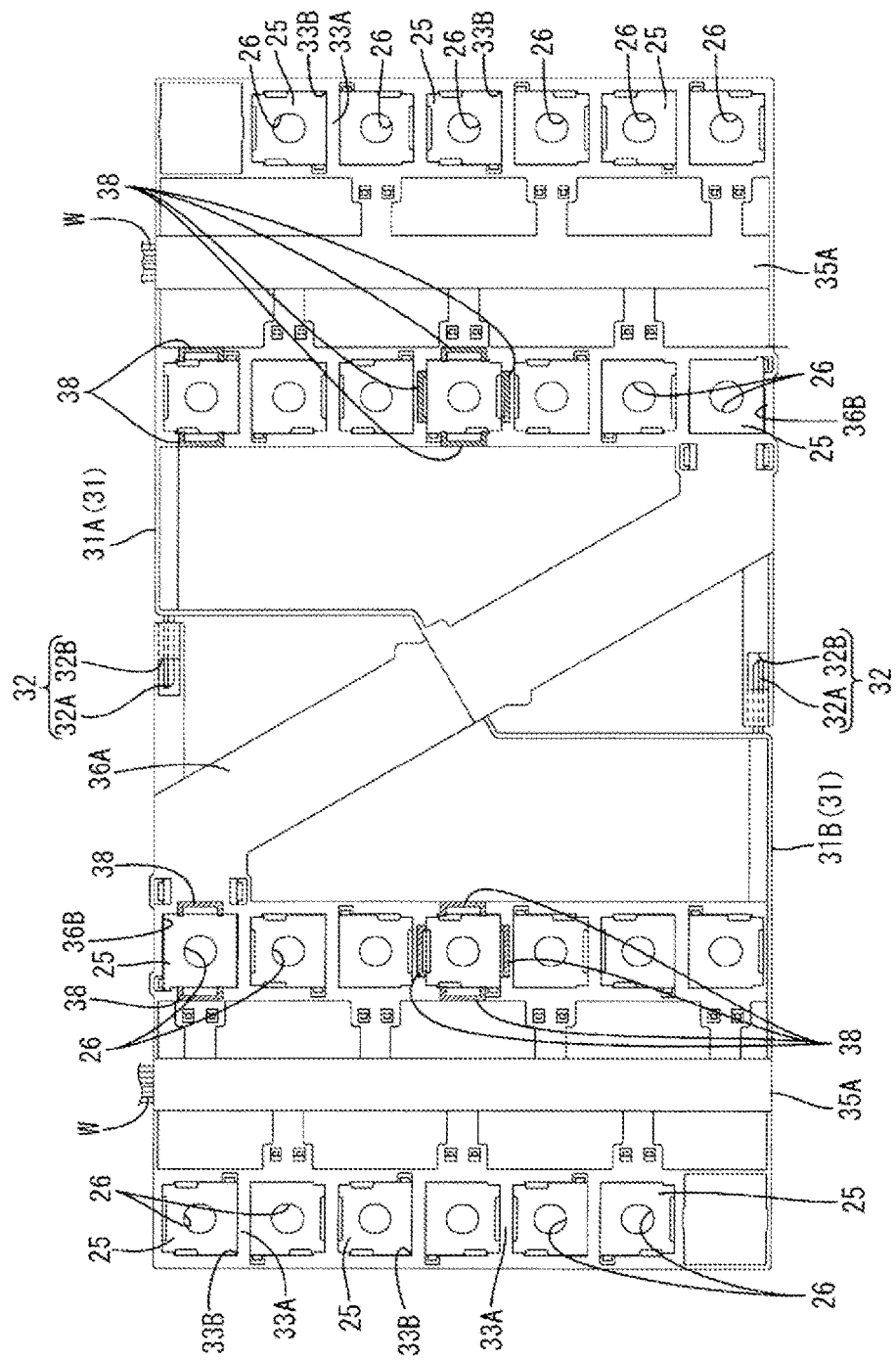
FIG. 4 is a partial section along A-A of FIG. 3.

As shown in FIG. 3, positioning portions 38 projecting down on the underside of the insulation protector 31 and are to be positioned with respect to the electrical storage element groups 12 by being fit into the nuts of the electrical storage elements 13. As shown in FIG. 4, the positioning portions 38 are formed on the undersides of the first and fourth first holding portions 33 from the top.

(Connection Method of Electrical Storage Device Groups 12)

Next, a connection method of the electrical storage element groups 12 is described.

As shown in FIG. 2, two electrical storage element groups 12 (12A, 12B) are arranged side by side eEach electrical storage element group 12A, 12B has seven electrical storage elements 13 are arranged so that the adjacent electrode terminals 14A, 14B have opposite polarities.

The voltage detection terminals 28 connected to the wires W subsequently are placed on the second connecting members 25 and the first connecting member 20 and this assembly is accommodated into the first holding portions 33 and the second holding portion 36 of the insulation protector 31 (this is a wiring module 11).

Subsequently, the wiring module 11 is mounted on surfaces of the two electrical storage element groups 12, 12 arranged side by side where the electrode terminals 14 are arranged. When the wiring module 11 is mounted on the electrical storage element groups 12, the nuts of the electrode terminals 14 are fit into the positioning portions 38 of the insulation protector 31 to position the insulation protector 31 and each terminal connecting portion 21 of the first connecting member 20 is positioned with respect to the electrical storage element groups 12.

If the two adjacent electrical storage element groups 12A, 12B are arranged as shown in FIG. 2, there is almost no tolerance between the two electrical storage element groups 12A, 12B in the arrangement direction of the electrical storage elements 13 (vertical direction as shown). Thus, the left and right units 31A, 31B of the wiring module 11 mounted on the electrical storage element groups 12 hardly are displaced (see FIG. 1). X1 in FIG. 2 denotes an interval between the adjacent electrical storage element groups 12. Cases where the two electrical storage element groups 12A, 12B are displaced in the arrangement direction of the electrical storage elements and the interval between the two electrical storage element groups 12A, 12B is different from the one shown in FIG. 2 are described below.

Figure 5:
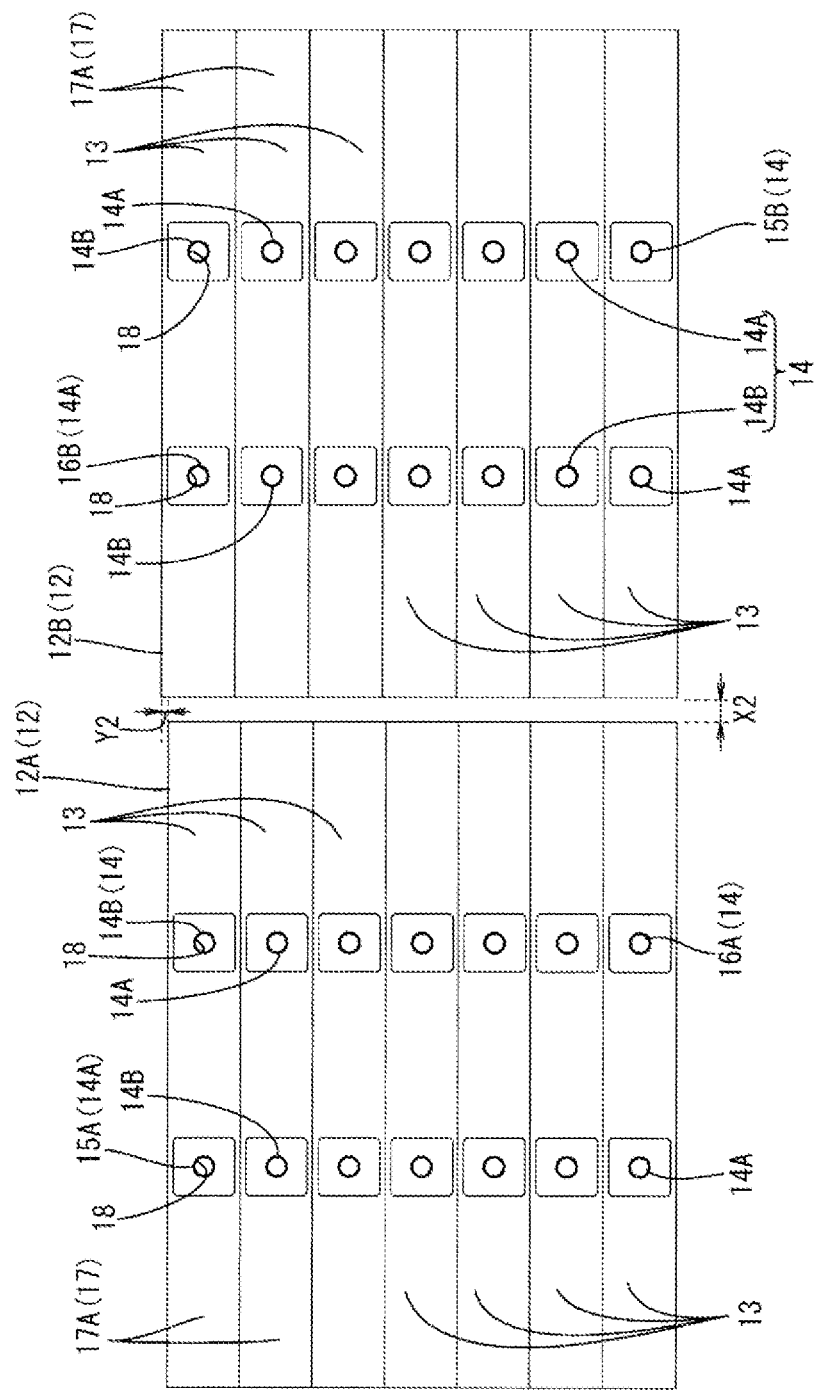
FIG. 5 is a plan view of the electrical storage element groups on which the insulation protector of FIG. 6 is to be mounted.

There are cases where, as shown in FIG. 5, the second electrical storage element group 12B is projecting more (upward in FIG. 5) than the first electrical storage element group 12A although an interval X2 between the adjacent two electrical storage element groups 12A, 12B is substantially equal to the interval X1 between the electrical storage element groups 12, 12 of FIG. 2. Y2 in FIG. 5 denotes a projecting distance and Z2 in FIG. 6 denotes an interval between the units 31A, 31B.

Figure 6:
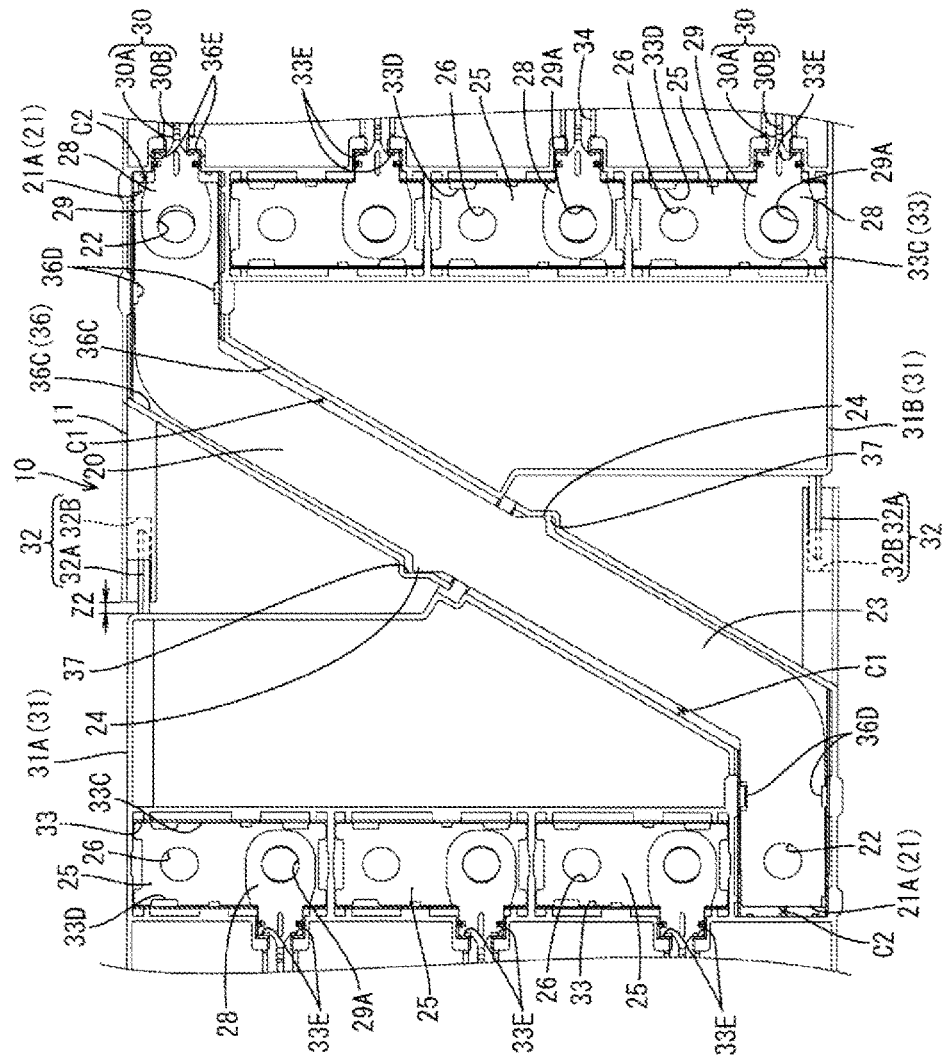
FIG. 6 is a partial plan view of the insulation protector to be mounted on the electrical storage element groups of FIG. 5.

Even in cases as shown in FIG. 5, the clearances C1, C2 are set between the link 23 of the first connecting member 20 and the protection wall 36C and between the end parts 21A of the terminal connecting portions 21 of the first connecting member 20 and the protection wall 36C in this embodiment. Thus, the first connecting member 20 is movable in the second holding portion 36 in both the arrangement direction of the electrical storage element groups 12 and that of the electrical storage elements 13. In cases as shown in FIG. 5, the wiring module 11 is mounted so that the right unit 31B is displaced upwardly with respect to the left unit 31A as shown in FIG. 6, and the connecting member 20 moves in the second holding portion 36 of the insulation protector 31.

Figure 7:
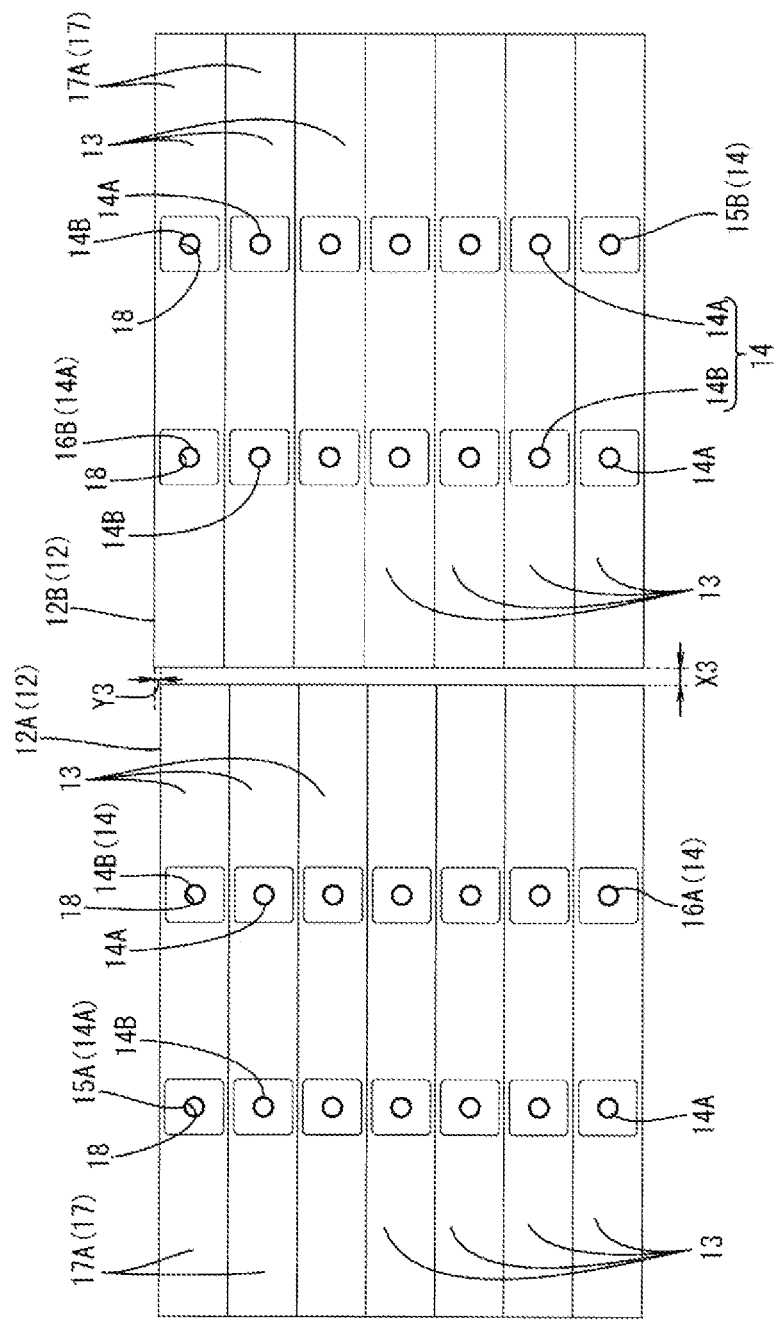
FIG. 7 is a plan view of the electrical storage element groups on which the insulation protector of FIG. 8 is to be mounted.

There are cases where, as shown in FIG. 7, an interval X3 between the two adjacent two electrical storage element groups 12A, 12B is smaller than the interval X1 between the electrical storage element groups 12, 12 of FIG. 2 and the second electrical storage element group 12B projects more (up in FIG. 7) than the first electrical storage element group 12A. Y3 in FIG. 7 denotes a projecting distance and Z3 in FIG. 8 denotes an interval between the units 31A, 31B.

Figure 8:
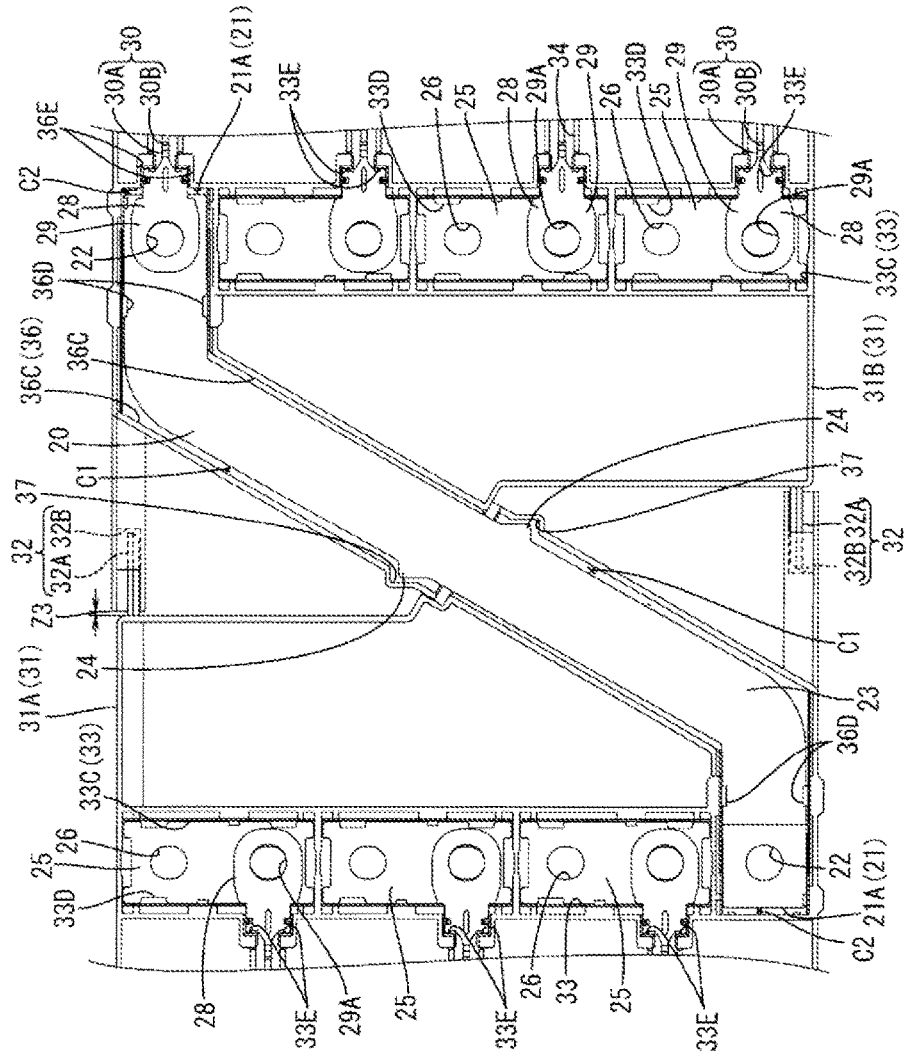
FIG. 8 is a partial plan view of the insulation protector to be mounted on the electrical storage element groups of FIG. 7.

Even in cases as shown in FIG. 7, the first connecting member 20 is movable in the second holding portion 36 in both the arrangement direction of the electrical storage element groups 12 and that of the electrical storage elements 13 as in cases as shown in FIG. 5. In cases as shown in FIG. 7, the wiring module 11 is mounted so that the right unit 31B is displaced up with respect to the left unit 31A and the interval Z3 between the units 31A, 31B is smaller than the interval Z2 as shown in FIG. 8, and the connecting member 20 moves in the second holding portion 36 of the insulation protector 31.

Figure 9:
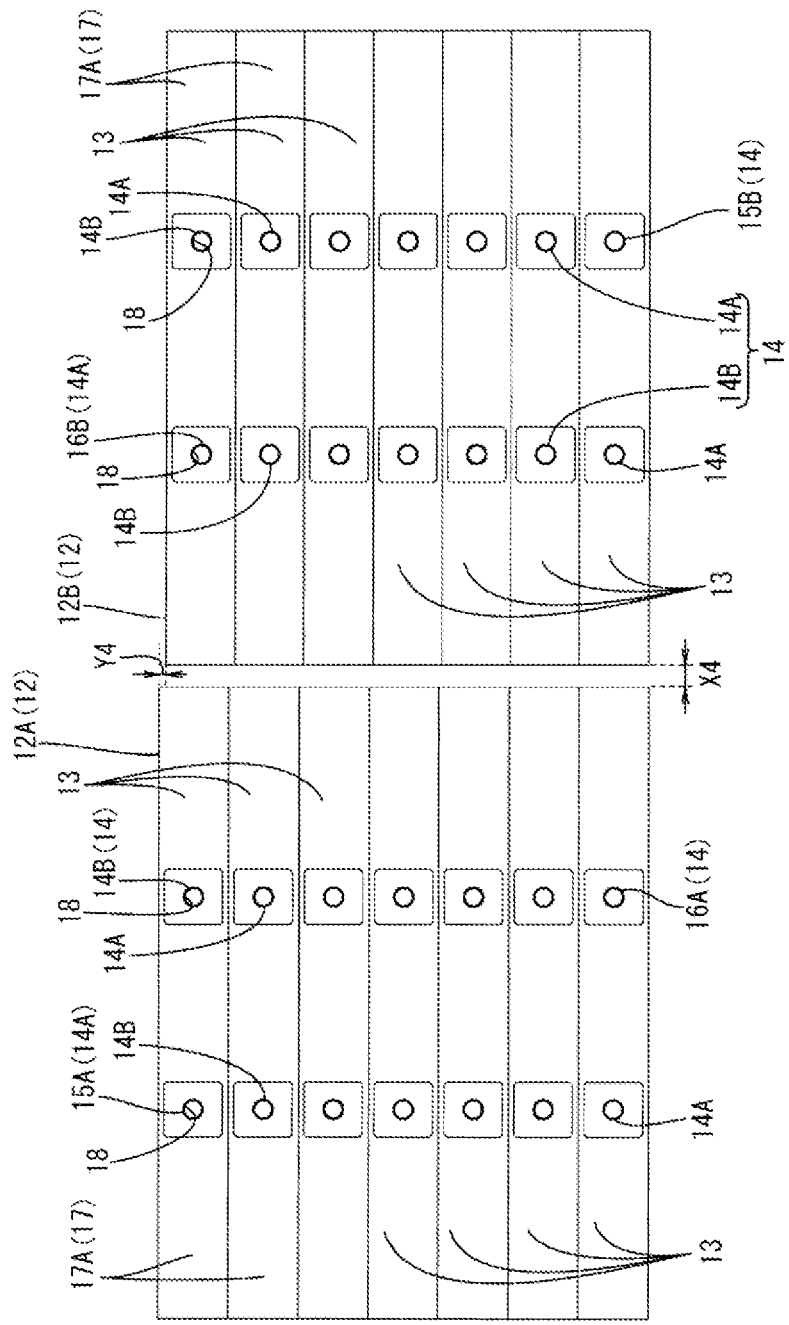
FIG. 9 is a plan view of the electrical storage element groups on which the insulation protector of FIG. 10 is to be mounted.

There are cases where, as shown in FIG. 9, the first electrical storage element group 12A is projecting more (up in FIG. 9) than the second electrical storage element group 12B although an interval X4 between the adjacent two electrical storage element groups 12A, 12B is substantially equal to the interval X1 between the electrical storage element groups 12, 12 of FIG. 2. Y4 in FIG. 9 denotes a projecting distance and Z4 in FIG. 10 denotes an interval between the units 31A, 31B.

Figure 10:
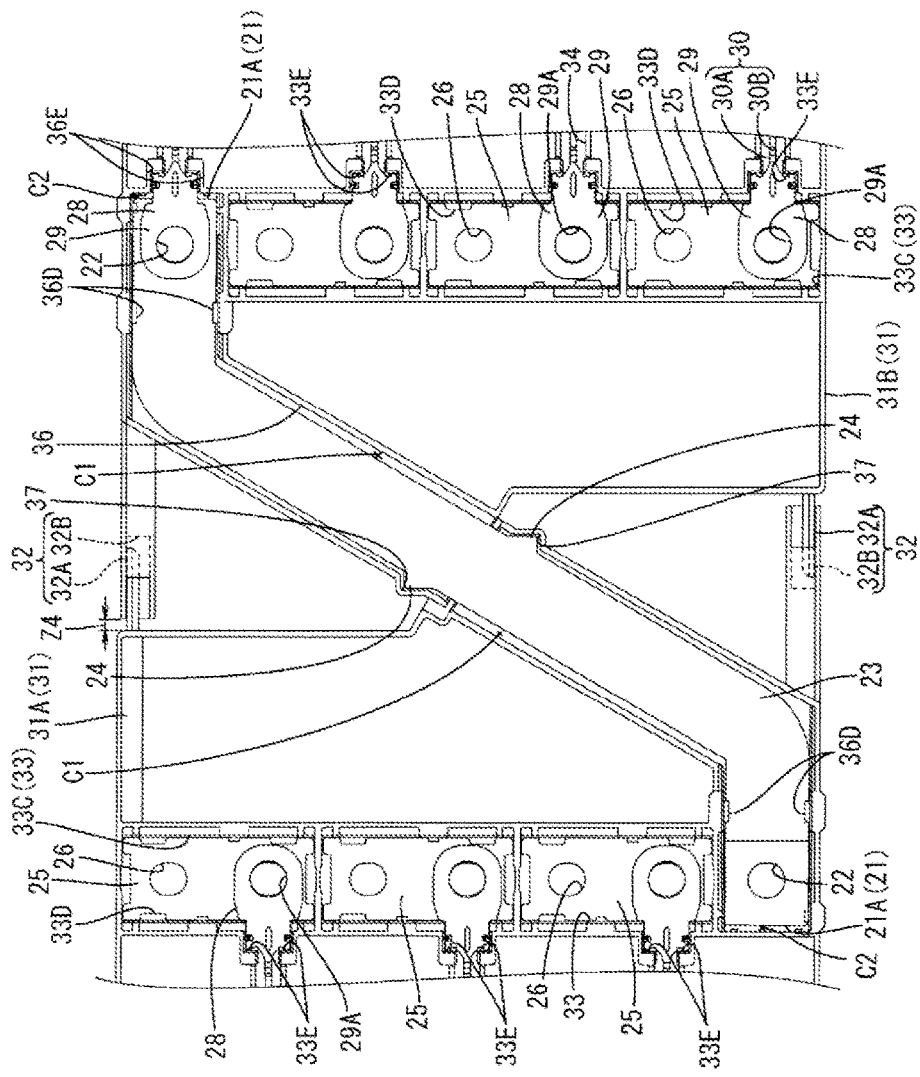
FIG. 10 is a partial plan view of the insulation protector to be mounted on the electrical storage element groups of FIG. 9.

Even in cases as shown in FIG. 9, the first connecting member 20 is movable in the second holding portion 36 in both the arrangement direction of the electrical storage element groups 12 and that of the electrical storage elements 13. In cases as shown in FIG. 9, the wiring module 11 is mounted so that the left unit 31A is displaced up with respect to the right unit 31B as shown in FIG. 10, and the connecting member 20 moves in the second holding portion 36 of the insulation protector 31.

The locks 24 of the first connecting member 20 are locked to the locked portions 37 of the second holding portion 36 regardless of which one of the arranged states of FIGS. 2, 5, 7 and 9 the arranged state of the two electrical storage element groups 12A, 12B is, excessive movements of the first connecting members 20 can be suppressed.

If the wiring module 11 is fixed to the electrical storage element groups 12 by being bolted to each electrode terminal 14 after being mounted in this way, the electrical storage module in a state where the electrical storage elements 13 can be connected electrically by the second connecting members 25 and the two electrical storage element groups 12, 12 can be electrically connected by the first connecting member 20 is obtained.

(Functions and Effects)

In this embodiment, the adjacent electrical storage element groups 12A, 12B are connected by the first connecting member 20 for connecting the first electrode terminal 16A that is the electrode terminal 14 arranged on one end part of one 12A of the adjacent electrical storage element groups 12 and on the side of the adjacent other electrical storage element group 12B, and the second electrode terminal 16B that is the electrode terminal 14 arranged on the other end part of the other electrical storage element group 12B opposite to the one end part of the one electrical storage element group 12A and on the side of the adjacent one electrical storage element group 12A.

That is, in this embodiment, the adjacent two electrical storage element groups 12A, 12B can be connected electrically by one connecting member 20 regardless of the number of the electrical storage elements 13 constituting the electrical storage element groups 12. Thus, weight saving is possible and a material for fabricating an electrically connecting member can be reduced. As a result, it is possible to provide the connection structure 10 for the electrical storage element groups 12 reduced in cost and weight.

Further, the insulation protector 31 is dividable into units for each electrical storage element group 12, and the clearances C1 are provided between the protection wall 36C of the second holding portion 36 of the insulation protector 31 and the link 23 of the first connecting member 20. Thus, the first connecting member 20 can move in the second holding portion 36 to be able to accommodate the displacement between the first electrode terminal 16A and the terminal connecting portion 21 and that between the second electrode terminal 16B and the terminal connecting portion 21 in the arrangement direction of the electrical storage elements 13, 13 and the arrangement direction of the electrical storage element groups 12, 12.

Further, the clearances C2 are provided between the end parts 21A of the terminal connecting portions 21 of the first connecting member 20 and the protection wall 36C. Thus, the displacement between the first electrode terminal 16A and the terminal connecting portion 21 and that between the second electrode terminal 16B and the terminal connecting portion 21 in the arrangement direction of the electrical storage element groups 12, 12 can be accommodated.

Further, the insulation protector 31 includes the positioning portions 38 to be positioned with respect to the electrical storage element groups 12. Thus, an operation of mounting the insulation protector 31 on the electrical storage element groups 12 is performed easily.

Furthermore, the link 23 of the first connecting member 20 is provided with the locks 24 to be locked to the second holding portion 36 of the insulation protector 31. Thus, excessive movements of the first connecting member 20 can be suppressed.

<Second Embodiment>

A second embodiment of the invention is described with reference to FIGS. 11 to 14. Components similar to those of the first embodiment are denoted by the same reference signs and repeated description is omitted.

Figure 11:
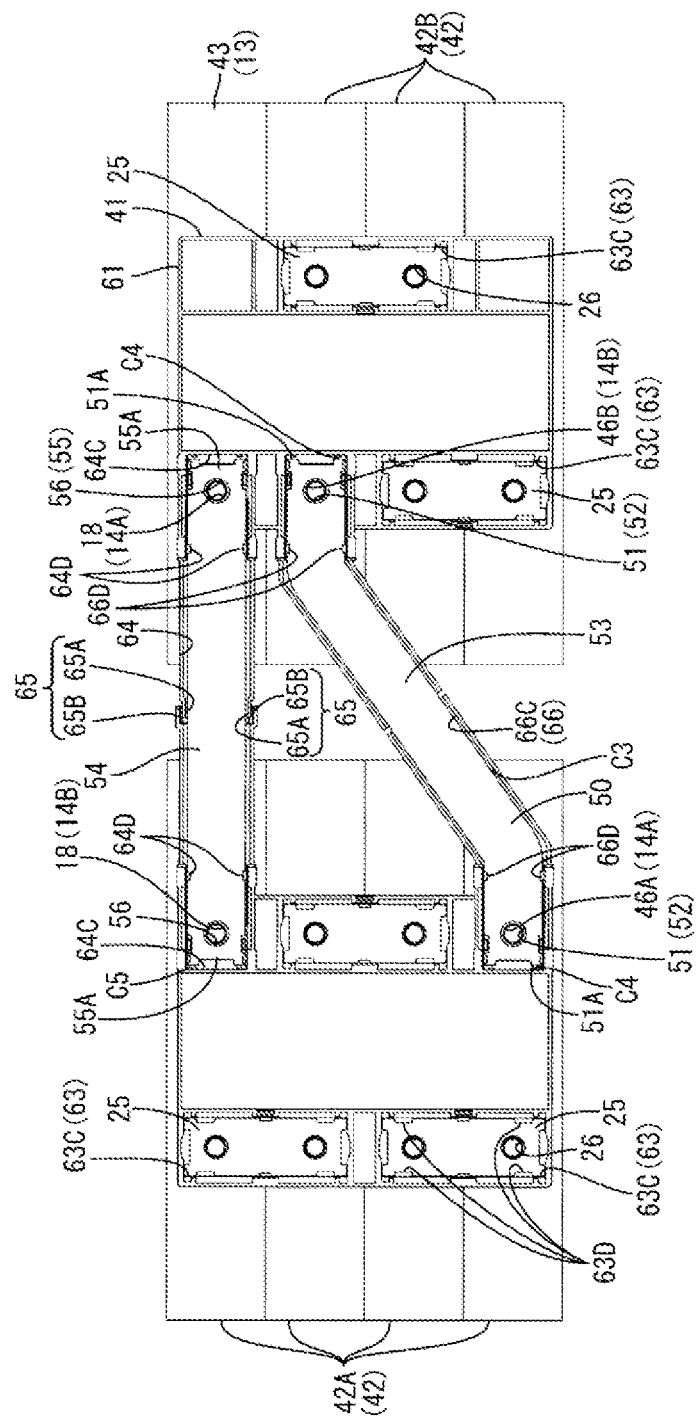
FIG. 11 is a plan view of an electrical storage module mounted with an insulation protector used in a connection structure for electrical storage element groups of a second embodiment.

This embodiment differs from the first embodiment in that a left electrical storage element group (an example of one electrical storage element group, referred to as a first electrical storage element group 42A) in FIG. 11 is connected electrically also to a shown right upper electrical storage element (third electrical storage element 43) (see FIG. 11).

A connection structure 40 for electrical storage element groups of this embodiment includes, as shown in FIG. 11, a first connecting member 50 (an example of a connecting member) for connecting two adjacent electrical storage element groups 42, second connecting members 25 for connecting between electrical storage elements 13, 13 constituting the electrical storage element groups 42 and an insulation protector 61 having a second holding portion 66 (an example of a holding portion) for holding the first connecting member 50. In this embodiment, the connection structure 40 further includes a third connecting member 54 for electrically connecting the first electrical storage element group 42A and the third electrical storage element 43.

(Electrical Storage Device Groups 42)

As shown in FIG. 11, the first electrical storage element group 42A is formed by connecting four electrical storage elements 13 in series, each electrical storage element 13 having positive and negative electrode terminals 14 on an electrode forming surface 17A of a main body portion 17. As shown in FIG. 11, the second electrical storage element group 42B is formed by connecting three electrical storage elements 13 in series, each electrical storage element 13 having positive and negative electrode terminals 14 on an electrode forming surface 17A of a main body portion 17. In each electrical storage element group 42, the electrical storage elements 13, 13 adjacent in a vertical direction of FIG. 11 are arranged so that the polarities of the electrode terminals 14, 14 thereof are opposite.

The electrode terminal 14 on a lower end part of a right side of the second electrical storage element group 42B out of the electrode terminals 14 of the two electrical storage element groups 42 (42A, 42B) is an input terminal 45A and the electrode terminal 14 on a shown right side of the third electrical storage element 43 is an output terminal 45B.

In this embodiment, the electrode terminal 14 arranged on a shown lower end part of the first electrical storage element group 42A (an example of one end part of one electrical storage element group) and on the side of the second electrical storage element group 42B is a first electrode terminal 46A. The electrode terminal 14 arranged on a shown upper one end part (another one end part opposite to the one end part) of the second electrical storage element group 42B and on the side of the first electrical storage element group 42A (on the side of the adjacent one electrical storage element group 42A) is a second electrode terminal 46B.

(First Connecting Member 50)

In this embodiment, the first connecting member 50 is made of metal such as copper, copper alloy, stainless steel (SUS) or aluminum. The first connecting member 50 includes a terminal connecting portion 51 to be connected to the first electrode terminal 46A on a left lower side in FIG. 11 and a terminal connecting portion 51 to be connected to the second end part 46B on a shown right upper end part. A part of the first connecting member 50 linking the two terminal connecting portions 51 is a link 53 that is is arranged in an oblique direction.

Through holes 52 penetrate through the terminal connecting portions 51 and shafts of bolts are to be inserted therethrough. The through holes 52 of the first connecting member 50 are larger than through holes 26 of second connecting members 25 and are capable of accommodating tolerances. The link 53 of the first connecting member 50 of this embodiment is not provided with any structure to be locked to the insulation protector 61. The configuration of the second connecting members 25 is as in the first embodiment.

(Third Connecting Member 54)

The third connecting member 54 is rectangular and is made of metal such as copper, copper alloy, stainless steel (SUS) or aluminum. The third connecting member 54 has a length corresponding to a dimension between the right electrode terminal of the first electrical storage element group 42A and the left electrode terminal 14 of the third electrical storage element 43 and is formed with a two through holes 56 through which shafts of bolts (not shown) are to be inserted. These through holes 56 have an elliptical shape long in the lateral direction.

(Insulation Protector 61)

The insulation protector 61 is made of an insulating material and is dividable into two units 61A, 61B for each electrical storage element group 42, as shown in FIG. 11. The insulation protector 61 is configured by coupling the two units 61A, 61B via coupling portions 65 provided on a third holding portion 64. The second holding portion 66 and the third holding portion 64 are formed by coupling the two units 61A, 61B.

Two rows of first holding portions 63 for holding the second connecting members 25 connecting between the electrical storage elements 13, 13 are provided on each of left and right end parts of the insulation protector 61 in FIG. 11. Further, the third holding portion 64 for holding the third connecting member 54 and the second holding portion 66 for holding the first connecting member 50 are provided substantially in the center of the insulation protector 61.

The first holding portion 63 includes a bottom plate 63A on which each second connecting member 25 is to be placed, and a holding wall 63C standing up from the bottom plate 63A along the outer peripheral edge of the second connecting members 25. Further, a retaining protrusion 63D for retaining the second connecting member 25 is provided on the inner surface of the holding wall 63C of the first holding portion 63. Parts of the bottom plate 63A into which the electrode terminals 14 are to be inserted define openings 63B where the bottom plate 63A is absent. The holding wall 63C is set at a height where a short circuit due to the contact of a tool or the like with the second connecting member 25 or a head of the bolt can be prevented.

The second holding portion 66 includes a bottom plate 66A on which the first connecting member 50 is to be placed, and a protection wall 66C standing up from the bottom plate 66A along the outer peripheral edge of the first connecting member 50. Parts of the bottom plate 66A where the electrode terminals 14 are to be arranged define openings 66B where the bottom plate 66A is absent. The protection wall 66C is set at a height where a short circuit due to the contact of the tool or the like with the first connecting member 50 or the head of the bolt can be prevented.

Retaining protrusions 66D for retaining the first connecting member 50 are provided on the inner surface of the protection wall 66C. Clearances C3 are provided between the protection wall 66C and the link 53 of the first connecting member 50 so that the first connecting member 50 moves in the second holding portion 66 to accommodate a displacement between the first electrode terminal 46A and the terminal connecting portion 51 and that between the second electrode terminal 46B and the terminal connecting portion 51 in an arrangement direction of the electrical storage elements 13 and an arrangement direction of the electrical storage element groups 42.

Further, clearances C4 are provided also between the protection wall 66C and end parts 51A of the terminal connecting portions 51 of the first connecting member 50 to be able to accommodate the displacement between the first end part 46A and the terminal connecting portion 51 and that between the second electrode terminal 46B and the terminal connecting portion 51 in the arrangement direction of the electrical storage element groups 42.

The third holding portion 64 for holding the third connecting member 54 includes a bottom plate 64A on which the third connecting member 54 is to be placed, and a protection wall 64C standing up from the bottom plate 64A along the outer peripheral edge of the third connecting member 54. Parts of the bottom plate 64A where the electrode terminals 14 are to be arranged serve as openings 64B where the bottom plate 64A is absent. The protection wall 64C is set at a height where a short circuit due to the contact of the tool or the like with the third connecting member 54 or the head of the bolt can be prevented. Retaining protrusions 64D for retaining the third connecting member 54 are provided on the inner surface of the protection wall 64C. Clearances C5 are provided also between the protection wall 64C and end parts 55A of terminal connecting portions 55 of the third connecting member 54 to be able to accommodate a displacement between the electrode terminal 14 of the third electrical storage element 43 and the terminal connecting portion 55 and that between the electrode terminal 14 of the first electrical storage element group 42A and the terminal connecting portion 55 in the arrangement direction of the electrical storage elements 42.

The third holding portion 64 is provided with the coupling portions 65 for coupling the two units 61A, 61B. The coupling portion 65 is composed of a coupling protrusion 65A and a coupling receiving portion 65B for receiving the coupling protrusion 65A, and the units 61A, 61B are coupled by the coupling protrusion 65A of one 61A or 61B of the adjacent units 61A, 61B being received by the coupling receiving portion 65B of the other unit 61B or 61A. The coupling protrusion 65A is movable in the coupling receiving portion 65B in the arrangement direction of the electrical storage element groups 42 (lateral direction of FIG. 11).

Figure 13:
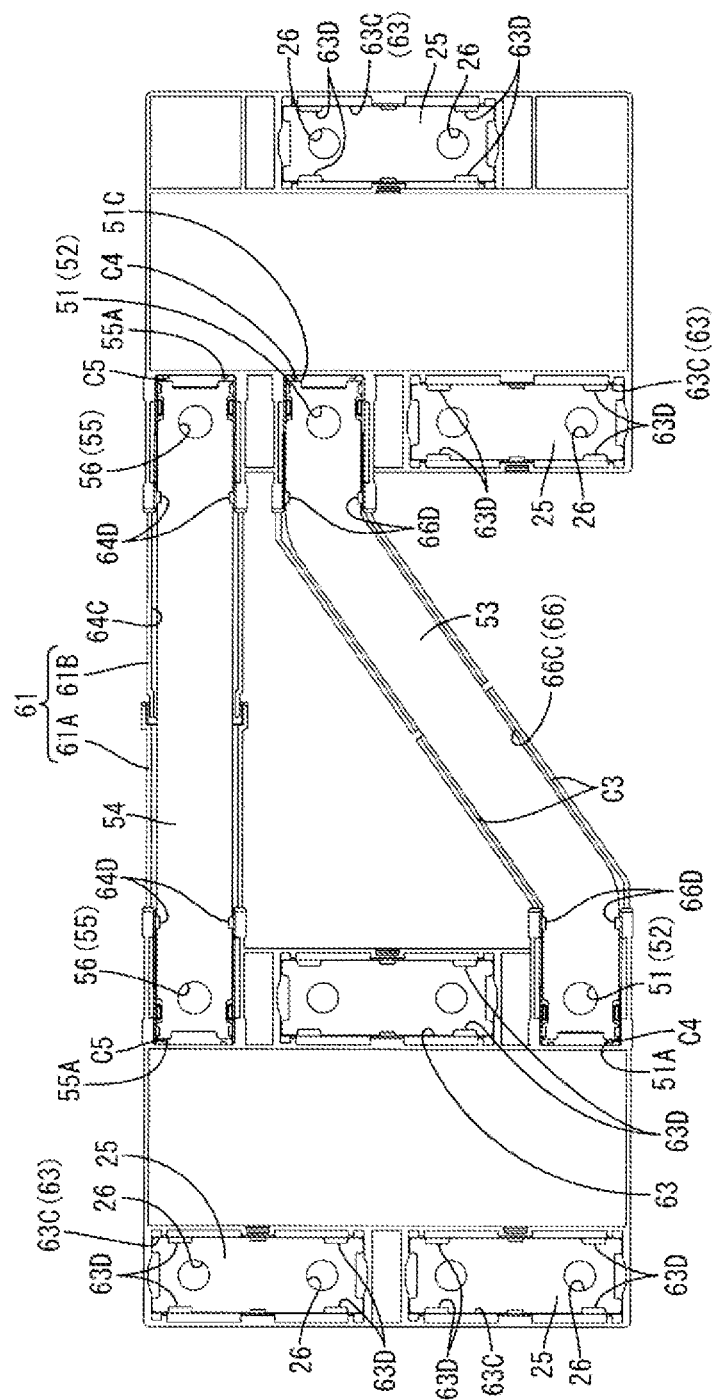
FIG. 13 is a plan view of the insulation protector.
Figure 14:
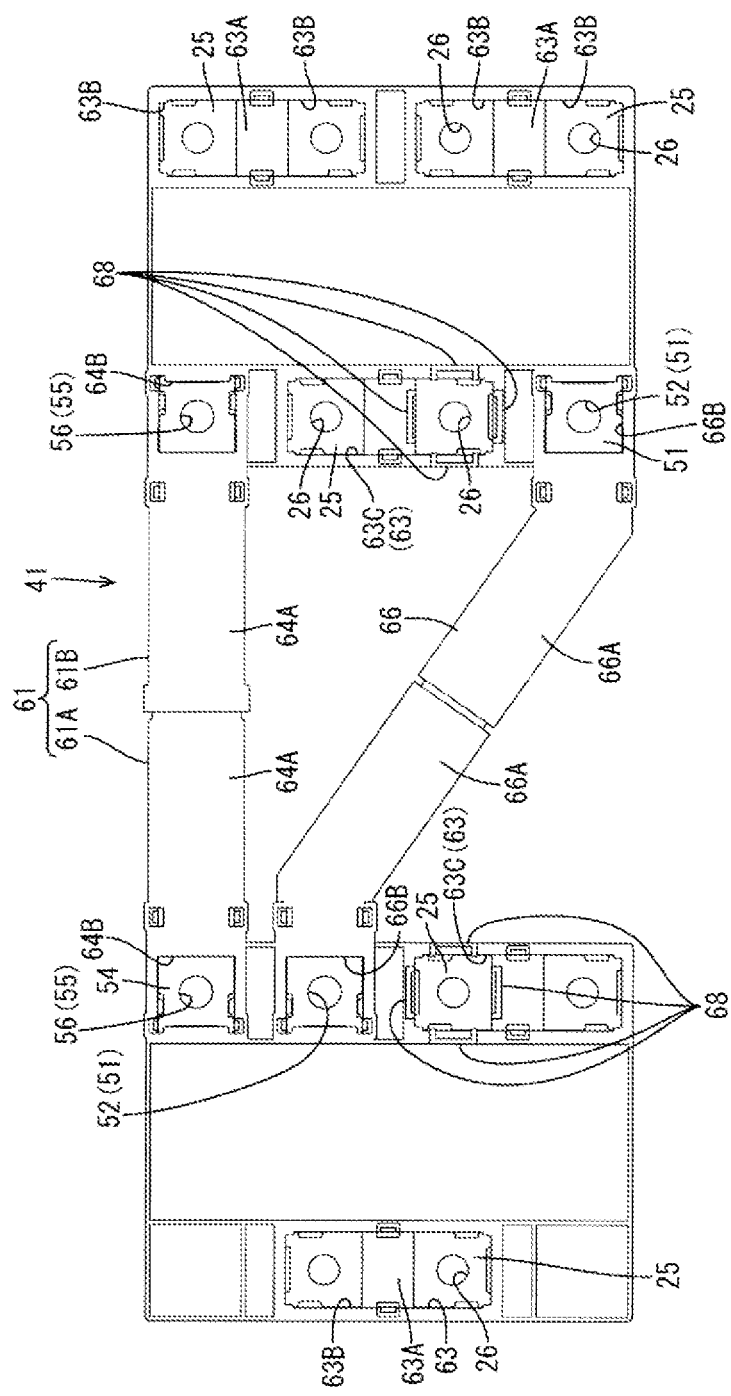
FIG. 14 is a bottom view of the insulation protector.

As shown in FIG. 13, positioning portions 68 project down on the underside of the insulation protector 61 and are to be positioned with respect to the electrical storage element groups 42 by being fit into nuts of the electrical storage elements 13. As shown in FIG. 14, the positioning portions 68 are formed on the underside of the third holding portions 63 from top.

(Connection Method of Electrical Storage Device Groups 42)

Next, a connection method of the electrical storage element groups 42 is described.

Figure 12:
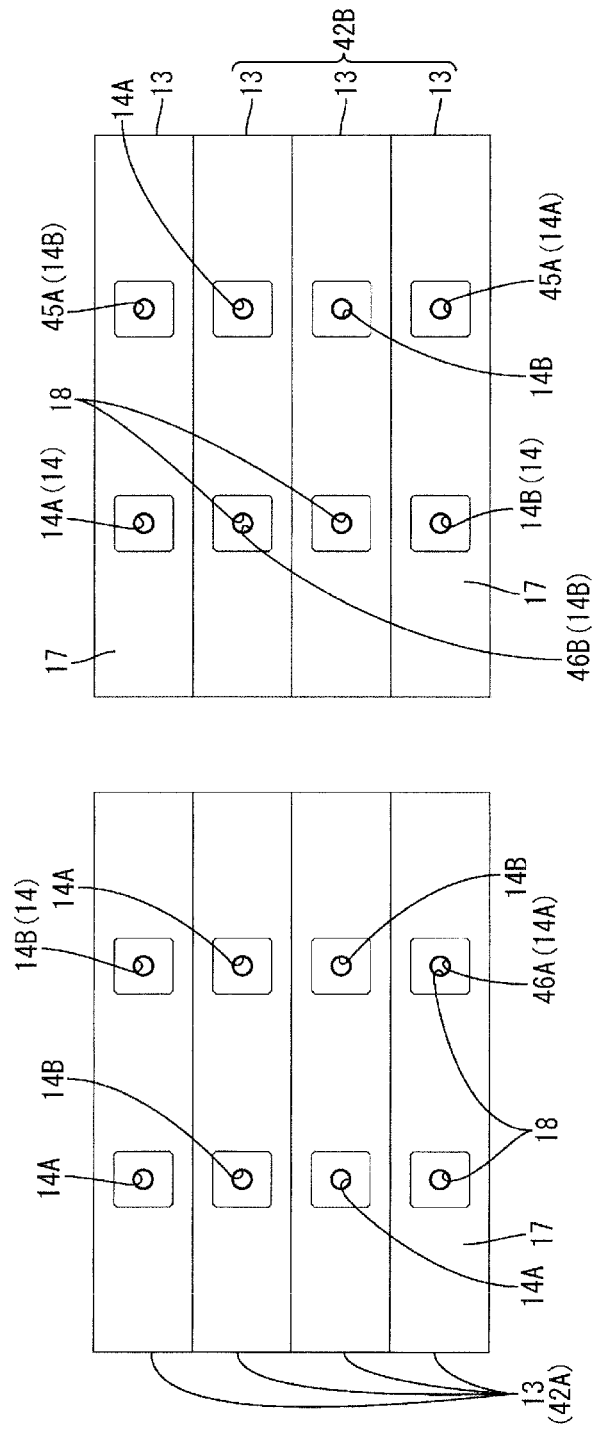
FIG. 12 is a plan view of the electrical storage element groups.

As shown in FIG. 12, the first electrical storage element group 42A in which four electrical storage elements 13 are arranged so that the adjacent electrode terminals 14A, 14B have opposite polarities and the second electrical storage element group 42B in which three electrical storage elements 13 are arranged so that the adjacent electrode terminals 14A, 14B have opposite polarities are fabricated and arranged side by side. Subsequently, the third electrical storage element 43 is arranged above the second electrical storage element group 42B as shown.

By coupling the two units 61A, 61B, the insulation protector 61 formed with the second holding portion 66 and the third holding portion 64 is obtained. By accommodating the first connecting member 50 into the second holding portion 66 of this insulation protector 61, the second connecting members 25 into the first holding portions 63 and the third connecting member 54 into the third holding portion 64, a wiring module 41 is obtained. If necessary, voltage detection terminals (not shown) connected to wires may be placed on predetermined connecting member(s) and accommodated in predetermined holding portions of the insulation protector 61. Voltage detection terminals configured as illustrated in the first embodiment may be used.

Subsequently, the wiring module 41 is mounted on surfaces of the two electrical storage element groups 42A, 42B arranged side by side and the third electrical storage element 43 where the electrode terminals 14 are arranged. When the wiring module 41 is mounted on the electrical storage element groups 42 and the third electrical storage element 43, the nuts of the electrode terminals 14 are fit into the positioning portions 68 of the insulation protector 61 to position the insulation protector 61 and each terminal connecting portion 51 of the first connecting member 50 is positioned on the electrical storage element groups 42.

If there is almost no tolerance between the two electrical storage element groups 42A, 42B in the arrangement direction of the electrical storage elements 13, the wiring module 41 is mounted on the electrical storage element groups 42 without any problem. Even if there is any deviation in the interval between the electrical storage element groups 42 or any displacement in the arrangement direction, the first connecting member 50 is movable in the second holding portion 66 in both the arrangement direction of the electrical storage element groups 42 and that of the electrical storage elements 13 since the clearances C3 are set between the link 53 of the first connecting member 50 and the protection wall 66C and the clearances C4 are set between the end parts 51A of the terminal connecting portions 51 of the first connecting member 50 and the protection wall 66C.

If the wiring module 41 is fixed to the electrical storage element groups 42 and the third electrical storage element 43 by being bolted to each electrode terminal 14 after being mounted in this way, an electrical storage module M in a state where the electrical storage elements 13 can be connected electrically by the second connecting members 25, the two electrical storage element groups 42A, 42B can be connected electrically by the first connecting member 50 and the first electrical storage element group 42A and the third electrical storage element 43 can be connected electrically by the third connecting member 54 is obtained.

(Effects and Functions)

Also in this embodiment, the adjacent two electrical storage element groups 42A, 42B can be connected electrically by one connecting member 50 regardless of the number of the electrical storage elements 13 constituting the electrical storage element groups 42 as in the first embodiment. Thus, weight saving is possible and a material for fabricating an electrically connecting member can be reduced. As a result, according to this embodiment, it is possible to provide the connection structure 40 for electrical storage element groups reduced in cost and weight.

Further, the following effects are obtained also by this embodiment.

According to this embodiment, the insulation protector 61 is dividable for each electrical storage element group 42, and the clearances C3 are provided between the protection wall 66C of the second holding portion 66 of the insulation protector 61 and the link 53 of the first connecting member 50. Thus, the first connecting member 50 can move in the second holding portion 66 to accommodate the displacement between the first electrode terminal 46A and the terminal connecting portion 51 and that between the second electrode terminal 46B and the terminal connecting portion 51 in the arrangement direction of the electrical storage elements 13, 13 and the arrangement direction of the electrical storage element groups 42.

According to this embodiment, the clearances C4 are provided between the end parts 51A of the terminal connecting portions 51 of the first connecting member 50 and the protection wall 66C. Thus, the displacement between the first electrode terminal 46A and the terminal connecting portion 51 and that between the second electrode terminal 46B and the terminal connecting portion 51 in the arrangement direction of the electrical storage element groups 42 can be accommodated.

According to this embodiment, since the insulation protector 61 includes the positioning portions 68 to be positioned with respect to the electrical storage element groups 42, an operation of mounting the insulation protector 61 on the electrical storage element groups 42 is performed easily.

The present invention is not limited to the above described and illustrated embodiments. For example, the following embodiments are also included in the technical scope of the present invention.

The insulation protector 31 dividable for each electrical storage element group 12 is illustrated in the above embodiments. However, an integrated insulation protector may be used.

The clearances C1, C2 are provided between the link 23 of the first connecting member 20 and the protection wall 36C and between the end parts 21A of the terminal connecting portions 21 of the first connecting member 20 and the protection wall 36C in the above embodiments. However either one of them may be provided.

The insulation protector 31 including the positioning portions 38 to be positioned with respect to the electrical storage element groups 12 is illustrated in the above embodiments. However, the positioning portions may not be provided.

The electrical storage module is formed by connecting two electrical storage element groups 42 and one electrical storage element 13 (third electrical storage element 43) in the second embodiment. However, an electrical storage element group composed of a plurality of electrical storage elements may be connected to two electrical storage element groups instead of one electrical storage element 13. Further, four or more electrical storage element groups may be connected.

LIST OF REFERENCE SIGNS 10, 40 . . . connection structure for electrical storage element groups
11, 41 . . . wiring module
12, 42 . . . electrical storage element group
12A, 42A . . . first electrical storage element group (one electrical storage element group)
12B, 42B . . . second electrical storage element group (other electrical storage element group)
13 . . . electrical storage element
14 . . . electrode terminal
14A . . . positive electrode terminal
14B . . . negative electrode terminal
15A, 45A . . . input terminal
15B, 45B . . . output terminal
16A, 46A . . . first electrode terminal
16B, 46B . . . second electrode terminal
20, 50 . . . first connecting member (connecting member)
21, 51 . . . terminal connecting portion
21A, 51A . . . end part (of terminal connecting portion)
23, 53 . . . linking portion locking portion
31, 61 . . . insulation protector
31A, 61A . . . (left) unit
31B, 61B . . . (right) unit
36, 66 . . . second holding portion
36A, 66A . . . bottom plate
36C, 66C . . . protection wall
36E . . . terminal holding portion
37 . . . locked portion
38, 68 . . . positioning portion
C1, C3 . . . clearance (between linking portion and protection wall)
C2, C4 . . . clearance (between end part of terminal connecting portion and protection wall)

The invention claimed is:

1. A connection structure for connecting first and second adjacent electrical storage element groups side by side in a group arrangement direction, each of the electrical storage element groups including plural electrical storage elements arranged in an element arranging direction that is orthogonal to the group arrangement direction, the electrical storage elements having aligned connecting surfaces each of which has a positive electrode terminal and a negative electrode terminal, the first electrical storage element group having opposite first and second ends, the second electrical storage element group having opposite first and second ends aligned respectively with the first and second ends of the first electrical storage element group, the electrical storage elements of each of the electrical storage element groups being connected in series, the connection structure comprising:

a connecting member connecting a first electrode terminal of the first electrical storage element group and a second electrode terminal of the second electrical storage element group, the first electrode terminal being arranged on the first end of the first electrical storage element group and on a side of the first electrical energy storage element group adjacent the second electrical storage element group, and the second electrode terminal being arranged on the second end of the second electrical storage element group and on a side of the second electrical storage element group adjacent the first electrical storage element group, the connecting member including first and second terminal connecting portions connected respectively to the first and second electrode terminals and a link linking the first and second terminal connecting portions and extending oblique to both the group arrangement direction and the element arrangement direction; and an insulation protector made of an insulating material and being dividable into first and second insulation protector units for protecting the connecting surfaces of the electrical storage elements in the respective first and second electrical storage element groups, the insulation protector including a recessed holding portion for holding the connecting member, the holding portion being recessed sufficiently to prevent contact with the connecting member, the holding portion of the insulation protector includes a protection wall arranged along a peripheral edge of the connecting member, a clearance being provided between the link of the connecting member and the protection wall in both the element arrangement direction and the group arrangement direction to accommodate movement between the connecting member and the first and second electrode terminals.

2. The connection structure for electrical storage element groups according to claim 1, wherein at least one additional clearance is provided between an end part of the terminal connecting portion of the connecting member and the protection wall.

3. The connection structure for electrical storage element groups according to claim 2, wherein the insulation protector includes a positioning portion to be positioned with respect to the electrical storage element groups.

4. The connection structure for electrical storage element groups according to claim 2, wherein the link of the connecting member includes a lock to be locked to the holding portion of the insulation protector.

* * * * *